Patented May 22, 1945

2,376,563

UNITED STATES PATENT OFFICE 2,376,563

PROCESSES FOR THE PRODUCTION OF STEROL DERIVATIVES

Daniel Hetfield Terry, Woodstown, N. J., assignor to E. I. du Pont de Nemours & Company, Wilmington, Del., a corporation of Delaware No Drawing. Application March 4, 1943, Serial No. 478,027

2 Claims. (Cl. 260—397.2)

This invention relates to new processes for producing sterol derivatives and in particular it refers to processes for the production of 7-hydroxy-cholesterol-7-mono esters from 7-hydroxy-cholesterol diesters.

It is an object of this invention to produce 7-hydroxy-cholesterol-7-mono esters by means of a new process. A further object is to produce these compounds from known intermediates by a new and relatively simple process. Additional objects will become apparent from the following description and claims.

These objects and others are attained in accordance with the present invention wherein 7-hydroxy-cholesterol esterified in both the 3- and 7-position is selectively deesterified in order to convert the 3-ester group to a hydroxyl group without substantial change in the ester group substituted on the 7-position. In a more restricted sense, this invention is concerned with the partial saponification of 7-hydroxy-cholesterol diesters whereby the 3-ester group is converted to a hydroxyl group without substantial change in the remainder of the molecule. In a still more limited sense this invention pertains to the partial saponification of a 7-hydroxy-cholesterol which is esterified in both the 3- and 7-position with dissimilar ester groups, the ester group in the 3-position being more susceptible to the reaction than that on the 7-position. Another embodiment of this invention concerns the partial saponification of 7-hydroxy-cholesterol substituted with similar ester groups on both the 3- and 7-position, the reaction being carried out in such manner that only the ester group substituted on the 3-position is affected.

The invention may be more readily understood by a consideration of the following example wherein the quantities are stated in parts by weight.

EXAMPLE

*Selective saponification of 7-hydroxy-cholesterol-dibenzoate*

To a suspension of 25 parts of 7-hydroxy-cholesterol-dibenzoate (of M. P. 174–175° C.) in 300 parts of methanol there was added a solution of 2.3 parts of potassium hydroxide in 40 parts of methanol. The mixture was agitated at 35–40° C. for 18 hours. After pouring onto ice, the mixture was extracted into ether. The ether extract was washed repeatedly with water until the water washes were neutral to litmus. The extract was then dried over anhydrous sodium sulfate and concentrated. The residue was dissolved in a minimum amount of methanol and cooled. Unreacted 7-hydroxy-cholesterol-dibenzoate crystallized. The residue from the methanolic mother liquor was recrystallized from hexane, from which the 7-hydroxy-cholesterol-7-monobenzoate was obtained in fine needles that melted at 96–109° C.

In place of 7-hydroxy-cholesterol-dibenzoate in the above example 7-hydroxy-cholesterol-diacetate may be substituted. An excellent yield of 7-hydroxy-cholesterol-7-mono acetate was obtained.

In place of 7-hydroxy-cholesterol-dibenzoate in the above example, 7-hydroxy-cholesterol-di-(3,5-dinitrobenzoate) may be substituted. Excellent yields of the corresponding 7-mono ester were obtained.

It is to be understood that the foregoing examples are illustrative merely of the present invention and that they may be varied widely with respect to the individual reactants, the amounts thereof and the conditions of reaction without departing from the scope hereof.

Ester groups contemplated for employment herein are exceedingly varied. They may be from the aliphatic, including the cyclo aliphatic, the aromatic and/or the aralkyl series. Since acids of the foregoing types are well known it is unnecessary to describe them in detail. Likewise it is unnecessary to describe the process of producing such diesters because esterification technique is an old and well understood art.

The ester groups substituted on the 3- and 7-position of the 7-hydroxy-cholesterol molecule may be the same or dissimilar. As a general rule it is advisable to substitute thereon dissimilar ester groups since the resulting partial saponification reaction is thereby simplified. In fact, it is frequently helpful if different types of ester groups are substituted on the foregoing positions. For example, if the ester group substituted on the 3-position is from the aromatic series the ester substituted on the 7-position may be from the aliphatic or aralkyl series. By a proper selection of these groups it is possible to conduct an extremely selective partial saponification reaction which will attack only the 3-substituent.

It is contemplated, however, that the ester groups present on both the 3- and 7-position may be identical. In this case the saponification reaction must be more carefully selected and conducted, since otherwise it will attack both substituents rather than being confined to the 3-substituent.

The particular saponification reaction employed and the precise conditions thereof will of course depend to a great extent upon the 7-hydroxy-cholesterol diester which is undergoing treatment. A few simple tests for any given diester will indicate the best saponifying agents and the preferred saponifying conditions for that particular ester.

By means of this invention 7-hydroxy-cholesterol-7-mono esters may be obtained from 7-hydroxy-cholesterol-7-diesters. The former compounds are particularly useful in the production of 7-dehydro-cholesterol, a well known and highly regarded provitamin D. This process is applicable to a wide variety of compounds, and permits their conversion into valuable derivatives in a simple and economical manner.

As many widely different embodiments of this invention may be made without departing from the spirit and scope thereof, it is to be understood that the invention is not limited to the specific embodiments thereof except as defined in the appended claims.

I claim:

1. A process for producing 7-hydroxy-cholesterol-7-monobenzoate which comprises partially saponifying 7 - hydroxy - cholesterol-dibenzoate with alcoholic caustic, whereby the 3-ester group alone is affected and is converted to a hydroxyl group.

2. A process for producing 7-hydroxy-cholesterol-7-monobenzoate which comprises treating a methanol solution of 7-hydroxy-cholesterol-dibenzoate with alcoholic potassium hydroxide for a sufficient period of time to affect only the 3-ester group and to convert it to a hydroxyl group.

DANIEL HETFIELD TERRY.